US007765053B2

(12) United States Patent
Gwidt et al.

(10) Patent No.: US 7,765,053 B2
(45) Date of Patent: Jul. 27, 2010

(54) MULTI-INJECTION COMBUSTION CYCLE SYSTEMS FOR SIDI ENGINES

(75) Inventors: Jesse M. Gwidt, Brighton, MI (US);
Michael J. Lucido, Northville, MI (US);
Vijay Ramappan, Novi, MI (US);
Halim G Santoso, Novi, MI (US);
Donovan L. Dibble, Utica, MI (US);
David J. Cleary, West Bloomfield, MI (US)

(73) Assignee: GM Global Technology Operations, Inc.

( * ) Notice: Subject to any disclaimer, the term of this patent is extended or adjusted under 35 U.S.C. 154(b) by 23 days.

(21) Appl. No.: 12/018,437

(22) Filed: Jan. 23, 2008

(65) Prior Publication Data
US 2009/0038583 A1 Feb. 12, 2009

Related U.S. Application Data

(60) Provisional application No. 60/964,439, filed on Aug. 10, 2007.

(51) Int. Cl.
*F02B 3/00* (2006.01)
*G06F 19/00* (2006.01)
*F02M 51/00* (2006.01)
*F01N 3/20* (2006.01)

(52) U.S. Cl. .................. 701/104; 701/103; 123/299; 123/305; 123/406.47; 60/285

(58) Field of Classification Search ............... 123/299, 123/294, 300, 435, 445, 345, 676, 406.45, 123/406.47, 27 R, 305; 701/103; 60/284, 60/285
See application file for complete search history.

(56) References Cited

U.S. PATENT DOCUMENTS

| 6,378,487 B1 * | 4/2002 | Zukouski et al. | 123/299 |
| 6,609,493 B2 * | 8/2003 | Yamaguchi et al. | 123/299 |
| 6,698,396 B2 * | 3/2004 | Pfaeffle et al. | 123/299 |
| 6,912,989 B2 * | 7/2005 | Tayama et al. | 123/276 |
| 7,089,908 B2 * | 8/2006 | Fujieda et al. | 123/299 |
| 7,240,659 B2 * | 7/2007 | Yang | 123/295 |
| 7,441,537 B2 * | 10/2008 | Szekely et al. | 123/299 |
| 7,467,615 B2 * | 12/2008 | Siewert | 123/299 |
| 7,480,557 B2 * | 1/2009 | Yamaguchi et al. | 701/104 |
| 2005/0224044 A1 * | 10/2005 | Stojkovic et al. | 123/299 |
| 2007/0006842 A1 * | 1/2007 | Kesse et al. | 123/299 |
| 2007/0113821 A1 * | 5/2007 | Kang et al. | 123/299 |
| 2007/0246004 A1 * | 10/2007 | Matekunas et al. | 123/299 |

OTHER PUBLICATIONS

Author: Bosch; Title: "GDI as a Low-Emission Concept"; Date: Nov. 3, 2007; 21 pages.

* cited by examiner

*Primary Examiner*—Willis R. Wolfe, Jr.
*Assistant Examiner*—Johnny H Hoang

(57) ABSTRACT

The fuel injection system includes a fuel injector that injects fuel directly into a combustion chamber of a cylinder of an engine. The control module initiates multiple fuel injections in a combustion chamber during a combustion cycle of the cylinder via the fuel injector.

20 Claims, 5 Drawing Sheets

MULTI-INJECTION COMBUSTION CYCLE SYSTEMS FOR SIDI ENGINES

CROSS-REFERENCE TO RELATED APPLICATIONS

This application claims the benefit of U.S. Provisional Application No. 60/964,439, filed on Aug. 10, 2007. The disclosure of the above application is incorporated herein by reference.

FIELD OF THE INVENTION

The present invention relates to spark ignition direct injection (SIDI) engines, and more particularly to fuel injection cycles thereof.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Spark ignition direct injection (SIDI) combustion systems (and other direct injection combustion systems) for internal combustion engines provide improved fuel economy and increased power over conventional port fuel-injected combustion systems. A SIDI engine includes a high pressure fuel injection system that sprays fuel directly into a combustion chamber. The fuel is directed to a specific region within the combustion chamber. As a result, a homogeneous or stratified charge may be created in the combustion chamber to provide improved fuel combustion characteristics. Also, throttling requirements associated with an SIDI engine tend to be less restrictive.

Referring now to FIG. 1, an exemplary SIDI engine 10 includes an engine block 12 that includes one or more cylinders 14. A spark plug 16 extends into a combustion chamber 18. The combustion chamber 18 is defined by a piston 20, the cylinder 14, and a cylinder head 21. The cylinder 14 includes one or more exhaust ports 22 and corresponding exhaust valves 24. The cylinder 14 includes also one or more intake ports 26 and corresponding intake valves 28. A fuel injector 30 extends into the combustion chamber 18. One or more of the fuel injectors 30 are connected to a fuel rail 32.

A fuel injection cycle of the SIDI engine 10 includes the delivery of fuel to the combustion chamber 18 via the fuel injectors 30 and the fuel rail 32. The fuel is injected in each cylinder once per combustion cycle. The injection typically occurs early in an intake stroke of the cylinder. The fuel is mixed with air in the cylinder and compressed during a compression stroke. At the end of the compression stroke the air/fuel mixture is ignited to provide a power stroke.

Although a SIDI engine tends to be more efficient during normal operation than a port-fuel injection (PFI) engine, a SIDI engine tends to generate more hydrocarbons during startup and cranking. Cranking refers to the initial rotating or crank over of an engine during startup. Since fuel is injected directly into a combustion chamber of a SIDI engine, there is less time for the fuel to mix with injected air than in a PFI engine. Thus, when the engine is cold, such as during cranking, less of the injected fuel burns and thus more hydrocarbons can be produced. The cooler the SIDI engine the larger the percentage of fuel that does not burn.

SUMMARY

In one exemplary embodiment a fuel injection system is provided. The fuel injection system includes a fuel injector that injects fuel directly into a combustion chamber of a cylinder of an engine. The control module initiates multiple fuel injections in a combustion chamber during a combustion cycle of the cylinder via the fuel injector.

In other features, an engine system is provided that includes an exhaust system, which receives an exhaust from an engine. A temperature sensor generates a temperature signal indicative of a temperature of a portion of the exhaust system. A fuel injector injects fuel directly into a combustion chamber of a cylinder of the engine. A control module initiates multiple fuel injections in the combustion chamber during a combustion cycle of the cylinder via the fuel injector based on the temperature.

In yet other features, a method of operating a spark ignition fuel injection (SIDI) engine is provided. The method includes operating a fuel injection system in a multi-injection combustion cycle mode. The multi-injection combustion cycle mode includes multiple fuel injections into a combustion chamber during a combustion cycle of a cylinder of the SIDI engine. A temperature signal is generated. The number of fuel injections during a combustion cycle of the cylinder is reduced based on the temperature signal.

In still other features, at least a portion of the systems and methods described herein may be implemented by a computer program executed by one or more processors. The computer program can reside on a computer readable medium such as but not limited to memory, non-volatile data storage, and/or other suitable tangible storage mediums.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figure 1:
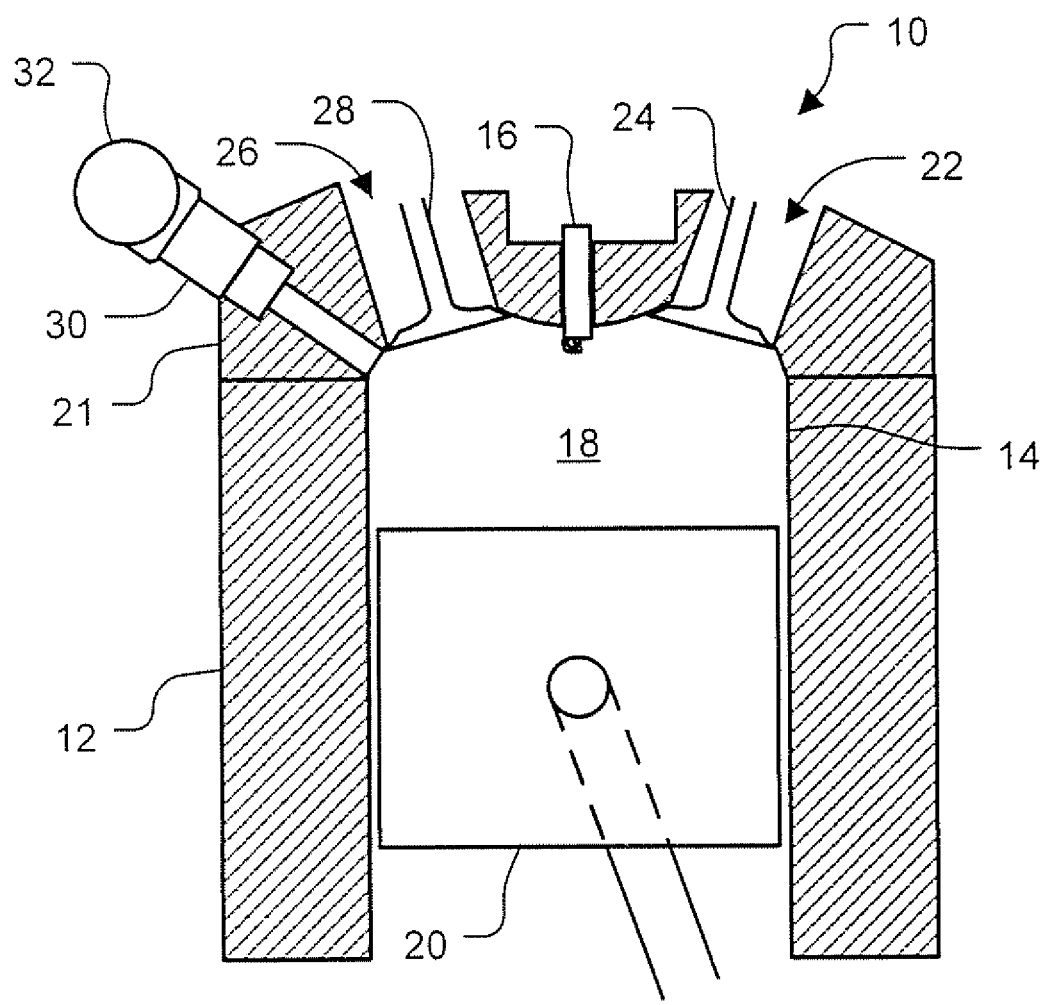
FIG. 1 is a cross-sectional view of a spark ignition direct injection (SIDI) engine cylinder according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke SIDI engine, a single combustion cycle may refer to and include an intake stroke, a compression stroke, a power stroke and an exhaust stroke. The four-strokes are continuously repeated during operation of the 4-stroke SIDI engine.

Figure 2:
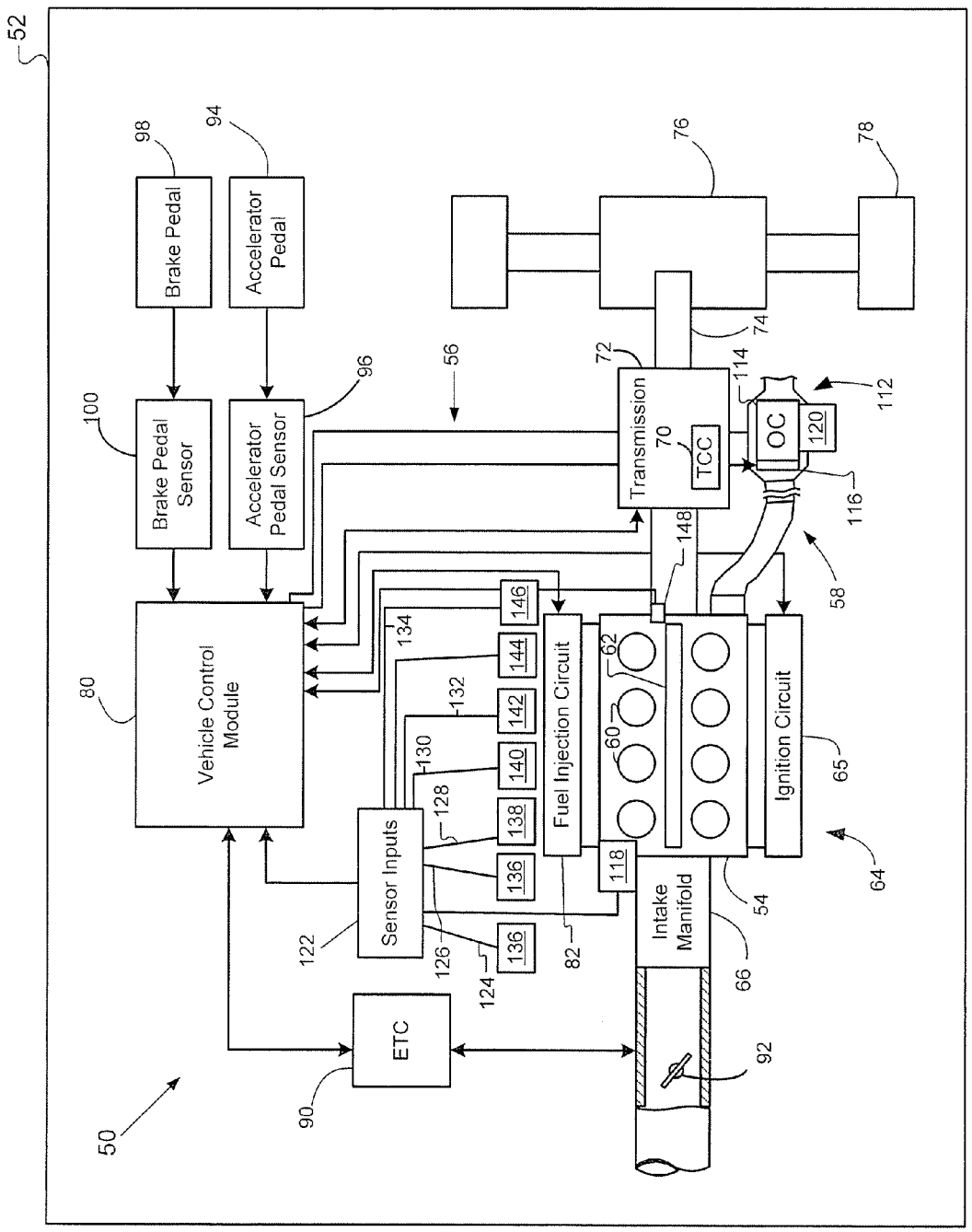
FIG. 2 is a functional block diagram of an SIDI engine system incorporating multi-fuel injections per cylinder combustion cycle in accordance with an embodiment of the present disclosure.

Referring now to FIG. 2, a functional block diagram of an SIDI engine system 50 incorporating multi-fuel injections per cylinder combustion cycle is shown. The SIDI engine system 50 is on a vehicle 52 and includes a SIDI engine 54, a multi-fuel injection combustion cycle (MFICC) system 56, and an exhaust system 58. The MFICC system 56 initiates multiple fuel injections per combustion cycle of at least one cylinder of the SIDI engine 54. In one embodiment, the multiple injections per combustion cycle occur during cranking of the SIDI engine 54. This improves air/fuel mixture burn in the cylinder(s) of interest and thus reduces emissions. The MFICC system 56 operates based on characteristics of the SIDI engine 54 and the exhaust system 58.

The SIDI engine 54 has cylinders 60. Each cylinder 60 may have one or more intake valves and/or exhaust valves. Each cylinder 60 also includes a piston that rides on a crankshaft 62. The SIDI engine 54 is configured with the MFICC system 56, an ignition system 64 with an ignition circuit 65, and the exhaust system 58. The SIDI engine 54 includes an intake manifold 66. The SIDI engine 54 combusts an air and fuel mixture to produce drive torque. The SIDI engine 54, as shown, includes eight cylinders configured in adjacent cylinder banks in V-type layout. Although FIG. 2 depicts eight cylinders (N=8), it can be appreciated that the SIDI engine 54 may include additional or fewer cylinders. For example, engines having 2, 4, 5, 6, 8, 10, 12 and 16 cylinders are contemplated. It is also anticipated that the fuel injection control of the present invention can be implemented in an inline-type or another type of cylinder configuration.

An output of the SIDI engine 54 is coupled by a torque converter 70, a transmission 72, a driveshaft 74 and a differential 76 to driven wheels 78. The transmission 72 may, for example, be a continuously variable transmission (CVT) or a step-gear automatic transmission. The transmission 72 is controlled by a vehicle control module 80.

Figure 4A:
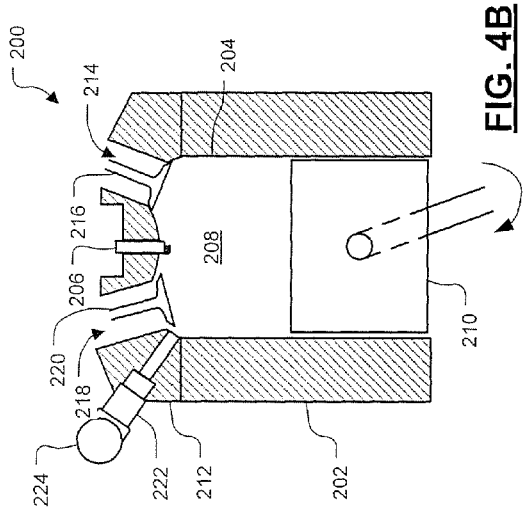
FIG. 4A is a cross-sectional view of a SIDI engine illustrating an intake stroke of a multi-fuel injection process in accordance with an embodiment of the present disclosure.
Figure 4B:
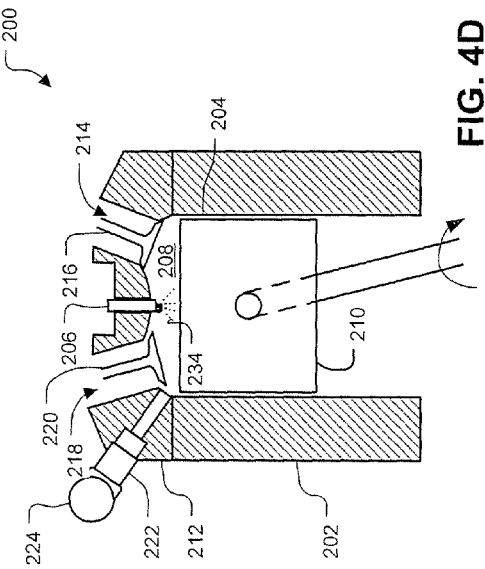
FIG. 4B is a cross-sectional view of the SIDI engine of FIG. 4A illustrating a crankshaft at bottom dead center (BDC) after an intake stroke.
Figure 4C:
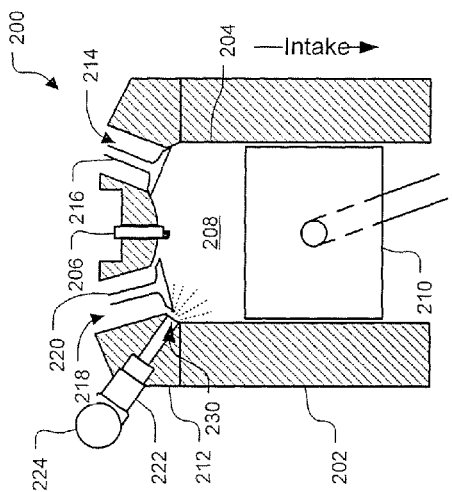
FIG. 4C is a cross-sectional view of the SIDI engine of FIG. 4A illustrating a compression stroke.

The MFICC system 56 includes a fuel injection circuit 82, with a fuel rail and fuel injectors, which are best seen in FIGS. 4A-4C, and the control module 80. A fuel injector is associated with each of the cylinders 60. The fuel rail provides fuel to each of the fuel injectors after reception from, for example, a fuel pump or reservoir. The control module 80 controls operation of the fuel injectors including the number and timing of fuel injections into each of the cylinders 60 and per combustion cycle thereof. The fuel injection timing may be relative to crankshaft positioning.

Air is drawn into the intake manifold 66 via an electronic throttle controller (ETC) 90, or a cable-driven throttle, which adjusts a throttle plate 92 that is located adjacent to an inlet of an intake manifold 66. The adjustment may be based upon a position of an accelerator pedal 94 and a throttle control algorithm that is executed by the control module 80. The throttle 92 adjusts output torque that drives the wheels 78. An accelerator pedal sensor 96 generates a pedal position signal that is output to the control module 80 based on a position of the accelerator pedal 94. A position of a brake pedal 98 is sensed by a brake pedal sensor or switch 100, which generates a brake pedal position signal that is output to the control module 80.

Air is drawn into the cylinders 60 from the intake manifold 66 and is compressed therein. Fuel is injected into cylinders 60 by the MFICC system 56 and the spark generated by the ignition system 64 ignites the air/fuel mixtures in the cylinders 60. Exhaust gases are exhausted from the cylinders 60 into the exhaust system 58. In some instances, the engine system 80 can include a turbocharger that uses an exhaust driven turbine to drive a compressor that compresses the air entering the intake manifold 66. The compressed air may pass through an air cooler before entering into the intake manifold 66.

The ignition system 64 may include spark plugs or other ignition devices for ignition of the air/fuel mixtures in each of the cylinders 60. The ignition system 64 also may include the control module 80. The control module 80 may, for example, control spark timing relative to crankshaft positioning.

The exhaust system 58 may include exhaust manifolds and/or exhaust conduits, such as the conduit 110 and a filter system 112. The exhaust manifolds and conduits direct the exhaust exiting the cylinders 60 into filter system 112. Optionally, an EGR valve re-circulates a portion of the exhaust back into the intake manifold 66. A portion of the exhaust may be directed into a turbocharger to drive a turbine. The turbine facilitates the compression of the fresh air received from the intake manifold 66. A combined exhaust stream flows from the turbocharger through the filter system 112.

The filter system 112 may include a catalytic converter or an oxidation catalyst (OC) 114 and a heating element 116, as well as a particulate filter, a liquid reductant system and/or other exhaust filtration system devices. The heating element 116 may be used to heat the oxidation catalyst 114 during startup of the SIDI engine 54 and be controlled by the control module 80. The liquid reductant may include urea, ammonia, or some other liquid reductant. Liquid reductant is injected into the exhaust stream to react with NOx to generate water vapor ($H_2O$) and $N_2$ (nitrogen gas).

The MFICC system 56 further includes one or more temperature sensors. In the embodiment shown, the MFICC system 56 includes an engine temperature sensor 118 and an exhaust temperature sensor 120. The engine temperature sensor 118 may detect oil or coolant temperature of the SIDI engine 54 or some other engine temperature. The exhaust temperature sensor 120 may detect temperature of the oxidation catalyst 114 or some other component of the exhaust system 58. The temperatures of the SIDI engine 54 and the exhaust system 58 may be indirectly determined or estimated based on engine and exhaust operating parameters and/or other temperature signals. Alternatively, the temperatures of the SIDI engine 54 and the exhaust system 58 may be determined directly via the engine and exhaust temperature sensors 118, 120.

Other sensor inputs collectively indicated by reference number 122 and used by the control module 80 include an engine speed signal 124, a vehicle speed signal 126, an intake manifold pressure signal 128, a throttle position signal 130, a transmission signal 132, and manifold air temperature signal 134. The sensor input signals 124-134 are respectively generated by engine speed sensor 136, vehicle speed sensor 138, intake manifold pressure sensor 140, throttle position sensor 142, transmission sensor 144, and temperature sensor 146. The temperature signal 146 may indicate air temperature in the intake manifold 66 or other temperature. Other sensors may also be included.

The MFICC system may also include a timing sensor 148. Although the timing sensor 148 is shown as a crankshaft position sensor, the timing sensor may be a camshaft position sensor, a transmission sensor, or some other timing sensor. The timing sensor generates a timing signal that is indicative of position of one or more pistons and/or a crankshaft.

Although the following embodiments are described primarily with the inclusion of dual fuel injection pulses per combustion cycle of a cylinder, when operating in a multi-fuel injection combustion cycle mode, two or more fuel injection pulses may be generated per combustion cycle. Also, different cylinders may exhibit a different amount of fuel injection pulses per combustion cycle. Furthermore, multiple fuel injections may occur during an intake stroke, a compression stroke, or a combination thereof.

Figure 3:
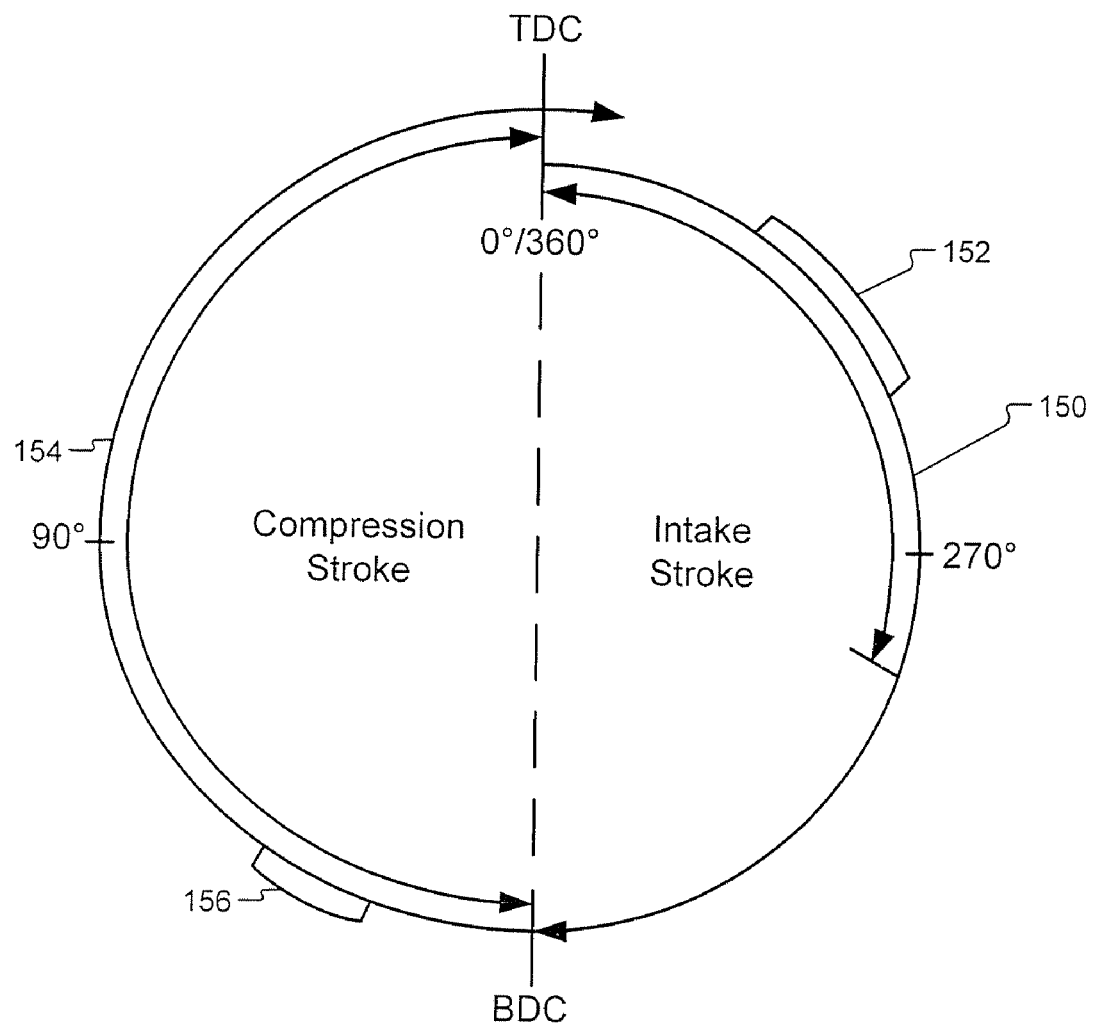
FIG. 3 is a crank diagram illustrating multi-fuel injections during intake and compression strokes of a combustion cycle of an SIDI engine in accordance with an embodiment of the present disclosure.

Referring now to FIG. 3, a crank diagram illustrating multi-fuel injections during intake and compression strokes of a combustion cycle of an SIDI engine is shown. The diagram illustrates crankshaft positioning during the intake and compression strokes. In an embodiment of the present invention, a first fuel injection (pulse) of a cylinder is initiated and occurs during the intake stroke 150 of that cylinder. A first fuel injection pulse 152 is shown and occurs approximately between 250° and 360° or between a position associated with top dead center (TDC) and 250°. The 0° or 360° position of the crankshaft is associated with TDC and the 180° position of the crankshaft is associated with bottom dead center (BDC). A second fuel injection (pulse) is initiated and occurs during the compression stroke 154 of the cylinder. A second fuel injection pulse 156 is shown that occurs approximately between 180° and 0° or between BDC and TDC.

In the embodiment shown, spark in the cylinder occurs approximately between 15° and 0° when in a cranking mode. The cranking mode or cranking refers to the initial rotating or crank over of an engine during startup. This may include a starter initially rotating the crankshaft. When switching from a cranking mode to an exhaust system heating mode and/or a normal operation mode the timing of the second fuel injection pulse and the associated spark may be adjusted. This is explained in further detail below.

Referring now to FIGS. 4A-4D, a multi-fuel injection process during a 4-stroke cycle of a SIDI engine 200 is shown. The SIDI engine includes an engine block 202 that includes one or more cylinders 204. A spark plug 206 extends into a combustion chamber 208. The combustion chamber 208 is defined by a piston 210, the cylinder 204, and a cylinder head 212. The cylinder 204 includes one or more exhaust ports 214 and corresponding exhaust valves 216. The cylinder 204 also includes one or more intake ports 218 and corresponding intake valves 220. A fuel injector 222 extends into the combustion chamber 208. One or more of the fuel injectors 222 are connected to a fuel rail 224.

The multi-fuel injection process includes an intake stroke, which is shown in FIG. 4A. During the intake stroke the intake valve 220 is opened to draw air into the cylinder 204. The fuel injector 222 initiates a first fuel injection 230 during the intake stroke, as shown. The first fuel injection 230 may be associated with and/or referred to as the start of fuel injection (SOI). The purpose of the first fuel injection 230 is to provide a base amount of fuel in the cylinder 204. The first fuel injection 230 assures that enough and/or an appropriate level of fuel enters the cylinder 204. In other words, the first fuel injection 230 assures that the homogenous mixture in the cylinder 204 is at least greater than an air/fuel mixture needed for a lean burn.

At approximately BDC the intake valve 220 closes, as shown in FIG. 4B. After BDC, the compression stroke begins, as shown by FIG. 4C. During the compression stroke the intake and exhaust valves 220, 216 remain closed and a second fuel injection 232 occurs. The second fuel injection 232 may be associated with and/or referred to as the end of fuel injection (EOI). The purpose of the second fuel injection 232 is to provide a rich stratified mixture near the spark plug 206 and when a spark is generated. This facilitates ignition of the air/fuel mixture. During the compression stroke pressures within the cylinder 204 increase. Thus, the second fuel injection 232 is atomized better than the first fuel injection.

Figure 4D:
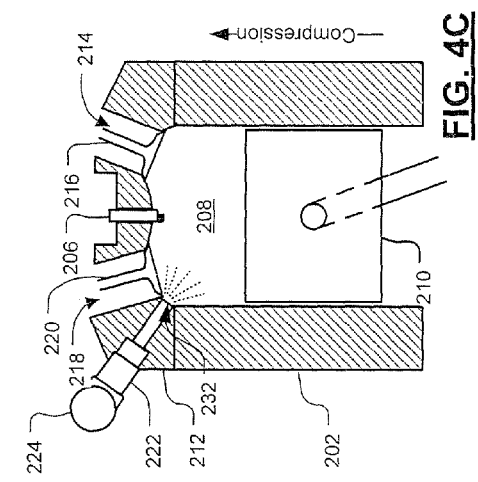
FIG. 4D is a cross-sectional view of the SIDI engine of FIG. 4A illustrating a crankshaft at top dead center (TDC) after a compression stroke.

Near the end, as shown, or after the compression stroke the spark plug generates a spark 234 to ignite the current air/fuel mixture. The piston may be near TDC as shown in FIG. 4D. The ignition of the air/fuel mixture initiates a power stroke.

The first fuel injection may include a greater amount of fuel than the second fuel injection. In one embodiment, the control module injects approximately 50%-90% of a total fuel injection amount for a combustion cycle of a cylinder in a first fuel injection. Approximately 10%-50% of the total fuel injection amount is injected in a second fuel injection. In another embodiment, the control module injects approximately two-thirds (⅔) of a total fuel injection amount for a combustion cycle of a cylinder in a first fuel injection. Approximately one-third (⅓) of the total fuel injection amount is injected in a second fuel injection.

Figure 5:
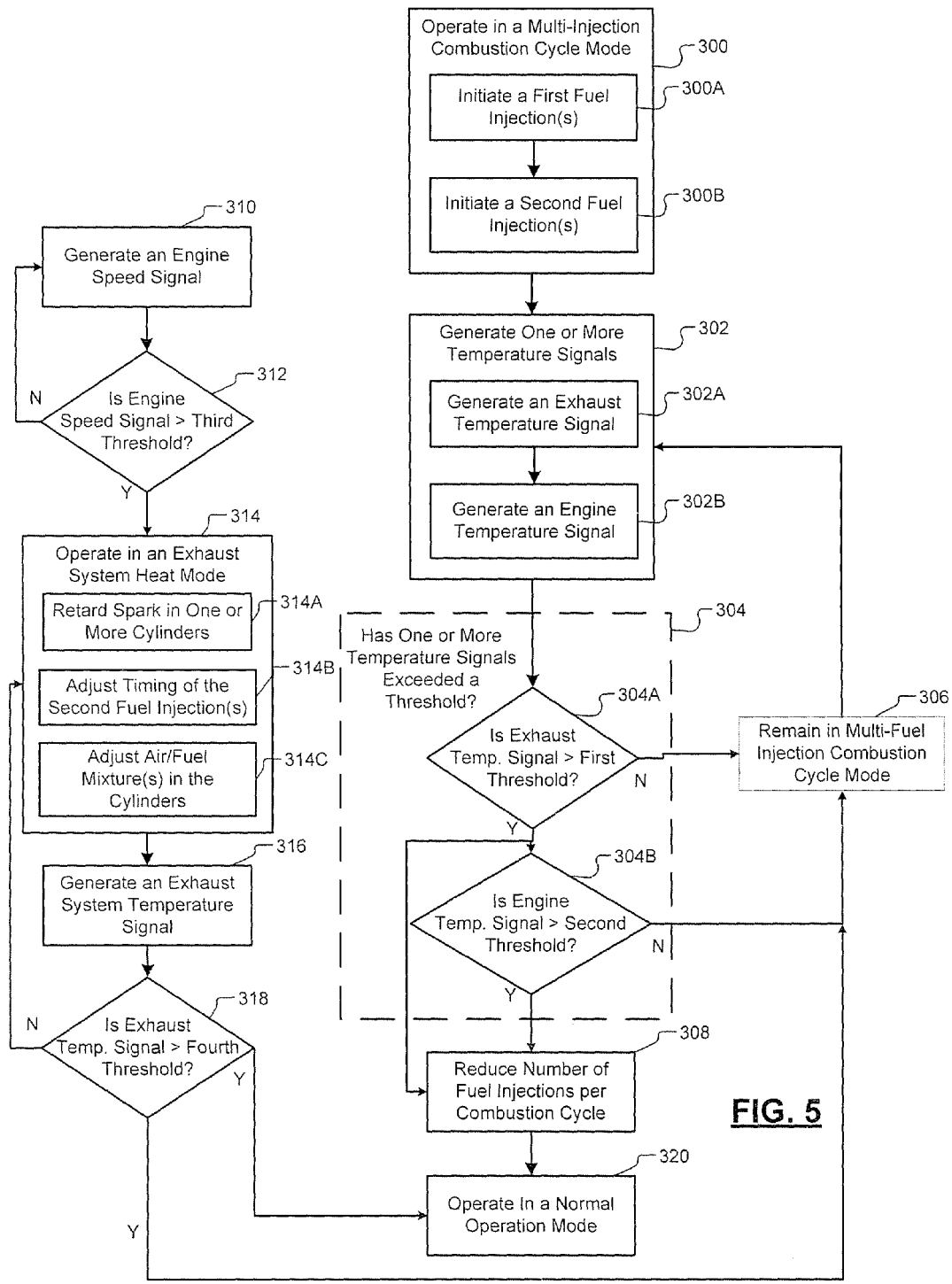
FIG. 5 is a logic flow diagram illustrating a method of operating an SIDI engine in accordance with an embodiment of the present disclosure.

Referring now to FIG. 5, a logic flow diagram illustrating a method of operating an SIDI engine is shown. Although the following steps are primarily described with respect to the embodiments of FIGS. 2-4, the steps may be easily modified to apply to other embodiments of the present invention.

In step 300, a fuel injection system, such as the MPICC system, is operated in a multi-injection combustion cycle mode. The multi-injection combustion cycle mode includes multiple fuel injections (fuel injection pulses) into a combustion chamber per a combustion cycle. Two or more fuel injections are initiated in a cylinder of the SIDI engine. The multi-fuel injections per combustion cycle described herein increase in-cylinder motion and create a rich, air/fuel ratio of less than 14.7:1 area near a spark plug, which increases combustion stability.

In step 300A, a first fuel injection may be initiated during each intake stroke of the cylinder. In one embodiment, the first fuel injection is initiated and may occur when a crankshaft of the SIDI engine is positioned approximately between TDC and 110° from TDC. An example of such an injection is the first fuel injection 152 of FIG. 3.

In step 300B, a second fuel injection may be initiated during a compression stroke of the cylinder. The second fuel injection is initiated and may occur during a time period when a crankshaft is positioned approximately between BDC and 110° from BDC. An example of such an injection is the second fuel injection 156 of FIG. 3. The second fuel injection has an associated second time period that nonoverlaps a first time period associated with the first fuel injection. The second time period may be independent, subsequent, different and separate from the first time period. The second time period may however abut the first time period. In other words, the first time period may occur late in an intake stroke and the second time period may occur early in a compression stroke. The second fuel injection may be initiated upon or simultaneously with completion of the first fuel injection.

The first and second fuel injections of steps 300A and 300B may be initiated and have duration based on engine operating parameters, such as air/fuel ratios, engine and exhaust temperatures, spark timing, air and fuel pressures, etc. For example, the second fuel injection may have a start time and duration that are based on spark timing. Timing of the second injection relative to spark timing alters effectiveness of the second injection.

In step 302, one or more temperature signals are generated. In step 302A, an exhaust temperature signal (or an exhaust system temperature signal) is generated. The exhaust temperature signal may be indirectly or directly generated, as described above, and be indicative of the temperature of a portion of an exhaust system or of an exhaust in an exhaust system. In step 302B, an engine temperature signal is generated. The engine temperature signal may also be indirectly or directly generated, as described above.

In step 304, a control module, such as the control module 80, determines whether the one or more temperature signals have exceeded one or more threshold values. The threshold values may be predetermined, selected, dynamically adjusted, and may vary per application. In step 304A, the control module determines whether the exhaust temperature signal has exceeded and/or is greater than a first predetermined threshold value. In one embodiment, the first predetermined threshold value is approximately 600-800° C. In another embodiment, the first predetermined threshold value is approximately 700° C. When the first predetermined threshold value is exceeded, the control module may proceed to step 304B or to step 308, otherwise proceeds to step 306.

In step 304B, the control module determines whether the engine temperature signal has exceeded and/or is greater than a second predetermined threshold value. In one embodiment, the second predetermined threshold value is approximately 40-60° C. In another embodiment, the second predetermined threshold value is approximately 50° C. When the second predetermined threshold value is exceeded, the control module may proceed to step 308, otherwise proceeds to step 306.

In step 306, the control module remains in the multi-fuel injection combustion cycle mode. The control module returns to step 302.

In step 308, the control module reduces a number of fuel injections per combustion cycle of the cylinder(s) of concern based on the temperature signals. As an example, the control module may switch from operating in a multi-fuel injection combustion cycle mode to operating in a normal operation mode. In the normal operation mode, the control module may initiate one or more fuel injections per combustion cycle. In yet another embodiment, the control module switches from initiating two fuel injections per combustion cycle to one fuel injection per combustion cycle. The control module may reduce number of fuel injections prior to, during, or after the exhaust system heating mode of step 314. Upon completion of step 308, the control module may proceed to step 320.

In step 310, an engine speed signal is generated. The engine speed signal may be indirectly or directly generated. The engine speed signal may be generated by a crankshaft or camshaft sensor, by a transmission sensor, a drivetrain sensor, or some other engine speed indicative signal generating device.

In step 312, the control module may determine whether the engine speed signal has exceeded a third predetermined threshold vale. The third predetermined threshold value may be predetermined, selected, dynamically adjusted, and may vary per application. In one embodiment, the third predetermined threshold value is approximately 600-900 revolutions-per-minute (RPM). In another embodiment, the third predetermined threshold value is approximately 800 RPM. When the third predetermined threshold value is exceeded, the control module may proceed to step 314, otherwise returns to step 310.

In step 314, the control module operates in an exhaust system heating mode. The control module adjusts temperature of at least a portion of the exhaust system via fuel injection control, timing of fuel injection, timing of spark, applying current to an exhaust system heating element, air flow control, etc. Heating an oxidation catalyst of an exhaust system allows the oxidation catalyst to get quickly up to emissions reducing temperatures. The control module may operate in the exhaust system heating mode while also operating in the multi-fuel injection combustion cycle mode. By operating in both the exhaust system heating mode and the multi-fuel injection combustion cycle mode, processor time consumed and associated with switching between modes is reduced.

In step 314A, the control module may retard spark in the cylinder(s) of concern. For example the spark may occur after the compression stroke rather than late in the compression stroke. As an example, the spark may occur approximately between TDC and 345°, as opposed to approximately between 15° and TDC. In step 314B, the control module may adjust timing of a second fuel injection. The adjustment may be based on a timing signal, such as from the timing sensor 148, and may delay the second fuel injection. For example, the second fuel injection may be initiated later in the compression stroke. In step 314C, the control module may adjust air flow and/or the amount fuel injected into the cylinder to provide a richer air/fuel mixture for increased exhaust system heating.

In step 316, an exhaust system temperature signal is generated. The exhaust system temperature signal may be the same as or in addition to the exhaust system temperature signal generated in step 304A.

In step 318, the control module determines whether the exhaust system temperature signal of step 316 has exceeded a fourth predetermined threshold value, which may be the same as the first predetermined threshold value. When the fourth predetermined threshold value is exceeded, the control module no longer operates in the exhaust system heat mode. The control module may continue to operate in the multi-fuel injection combustion cycle mode, and proceed to step 306 or may proceed to step 320. When the fourth predetermined threshold value is not exceeded, the control module returns to step 316.

In step 320, the control module operates in the normal operation mode. During the normal operation mode, the control module is not operating in the multi-fuel injection combustion cycle mode or the exhaust system heating mode. During the normal operation mode, the spark may not be retarded and the air/fuel mixture may be at a stoichiometric ratio of 14.7:1. The air/fuel ratio may refer to the amount of air drawn into the cylinder per combustion cycle relative to the total fuel injected in that combustion cycle. The total fuel injected may include multiple injections.

The above-described steps are meant to be illustrative examples; the steps may be performed sequentially, synchronously, simultaneously, continuously, during overlapping time periods or in a different order depending upon the application.

The embodiments disclosed herein reduce the amount of engine out hydrocarbons. Hydrocarbons are especially reduced during cranking and startup of an engine. This reduction is provided without an increase in fuel injection hardware.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel injection system comprising:
   a fuel injector that injects fuel directly into a combustion chamber of a cylinder of an engine; and
   a control module that initiates a first fuel injection in said combustion chamber during a first time period of a combustion cycle of said cylinder via said fuel injector,
   wherein said control module initiates a second fuel injection in said combustion chamber during a second time period of said combustion cycle via said fuel injector,
   wherein said second time period is nonoverlapping said first time period,
   wherein said control module initiates said first fuel injection and said second fuel injection during an exhaust system heating mode, and
   wherein said control module retards spark timing of the engine, adjusts timing of said second fuel injection, and decreases an air/fuel ratio of the engine during said exhaust system heating mode.

2. The fuel injection system of claim 1 further comprising a timing sensor that generates a timing signal that is indicative of a crank shaft position of said engine,
   wherein said control module adjusts timing of one of said first and second fuel injections based on said timing signal.

3. The fuel injection system of claim 1 wherein said control module initiates said first fuel injection during an intake stroke and said second fuel injection during a compression stroke.

4. The fuel injection system of claim 1 wherein said control module initiates said first fuel injection approximately when a piston in said cylinder is at a position approximately between top dead center and 110° from top dead center.

5. The fuel injection system of claim 1 wherein said control module initiates said second fuel injection approximately when a piston in said cylinder is at a position approximately between bottom dead center and 110° from bottom dead center.

6. The fuel injection system of claim 1 wherein said control module injects approximately 50%-90% of a total fuel injection amount for a combustion cycle of said cylinder in said first fuel injection and approximately 10%-50% of said total fuel injection amount in said second fuel injection.

7. The fuel injection system of claim 1 wherein said control module injects a greater amount of fuel in said first fuel injection than in said second fuel injection of a combustion cycle of said cylinder.

8. The fuel injection system of claim 1 wherein said control module injects approximately two-thirds (⅔) of a total fuel injection amount for a combustion cycle of said cylinder in said first fuel injection and approximately one-third (⅓) of said total fuel injection amount in said second fuel injection.

9. The fuel injection system of claim 1 further comprising a temperature sensor that generates a temperature signal,
   wherein said control module reduces number of fuel injections in a combustion cycle of said cylinder based on said temperature signal.

10. The fuel injection system of claim 9 wherein said temperature signal is indicative of a temperature of at least one of said engine and a portion of an exhaust system.

11. An engine system comprising:
    an exhaust system that receives an exhaust from an engine;
    a temperature sensor that generates a temperature signal indicative of a temperature of a portion of said exhaust system;
    a fuel injector that injects fuel directly into a combustion chamber of a cylinder of said engine; and
    a control module that initiates a plurality of fuel injections during nonoverlapping time periods and in said combustion chamber during a single combustion cycle of said cylinder via said fuel injector and based on said temperature,
    wherein said control module initiates said plurality of fuel injections during an exhaust system heating mode, and
    wherein said control module retards spark timing of said engine, adjusts timing of said plurality of fuel injections, and decreases an air/fuel ratio of said engine during said exhaust system heating mode.

12. The engine system of claim 11 wherein said control module operates in a cranking mode and said exhaust system heating mode.

13. The engine system of claim 12 wherein said control module, when in said cranking mode, operates in a multi-injection combustion cycle mode and initiates a first fuel injection during an intake stroke of said cylinder and initiates a second fuel injection during a compression stroke of said cylinder.

14. The engine system of claim 12 wherein said control module, when transitioning to or during said exhaust system heating mode, adjusts timing of a fuel injection to occur later in a compression stroke.

15. The engine system of claim 12 further comprising an ignition system that generates a spark in said cylinder during each of said combustion cycles,
    wherein said control module, when in said exhaust system heating mode, retards timing of said spark and delays initiation of said second fuel injection.

16. The engine system of claim 12 wherein said control module reduces number of fuel injections when transitioning between at least one of said cranking mode and said exhaust heating mode to a normal operation mode.

17. A method of operating a spark ignition fuel injection (SIDI) engine comprising:
    operating a fuel injection system in a multi-injection combustion cycle mode that comprises:
       initiating a first fuel injection pulse into a combustion chamber during a first time period and during a combustion cycle of a cylinder of the SIDI engine; and
       initiating a second fuel injection pulse into said combustion chamber during a second time period that is nonoverlapping said first time period and during said combustion cycle;
    generating a temperature signal;
    reducing a number of fuel injections during a combustion cycle of said cylinder based on said temperature signal;
    initiating said first fuel injection and said second fuel injection during an exhaust system heating mode; and during said exhaust system heating mode, retarding spark timing of said SIDI engine, adjusting timing of said second fuel injection, and decreasing an air/fuel ratio of said SIDI engine.

18. The method of claim 17 wherein said temperature signal is indicative of at least one of an engine temperature and an exhaust system temperature.

19. The method of claim 17 comprising:

initiating said first fuel injection during an intake stroke; and initiating said second fuel injection during a compression stroke.

20. The method of claim 17 comprising:

initiating said first fuel injection approximately when a crankshaft of said engine is in a position between top dead center and 110° from top dead center; and initiating said second fuel injection approximately when said crankshaft is in a position between bottom dead center and 110° from bottom dead center.

* * * * *